United States Patent [19]
Wolford

[11] Patent Number: 4,815,747
[45] Date of Patent: Mar. 28, 1989

[54] FACE TYPE SEAL ASSEMBLY

[75] Inventor: Dale E. Wolford, Ashland, Ohio

[73] Assignee: The Gorman-Rupp Company, Mansfield, Ohio

[21] Appl. No.: 150,615

[22] Filed: Feb. 1, 1988

[51] Int. Cl.[4] ............................................. F04D 29/10
[52] U.S. Cl. ......................................... 277/1; 277/82; 277/DIG. 10; 415/170 R; 415/174
[58] Field of Search .................. 277/81 R, 82, 83, 85, 277/86, 92, 93 R, 93 SD, 38–41, DIG. 10, 1; 415/170 R, 174

[56] References Cited

U.S. PATENT DOCUMENTS

| | | |
|---|---|---|
| 2,220,814 | 11/1940 | Erbach . |
| 2,430,426 | 11/1947 | Katcher . |
| 2,463,695 | 3/1949 | Jensen . |
| 2,467,239 | 4/1949 | Snyder . |
| 2,702,203 | 2/1955 | Sefren . |
| 2,785,913 | 3/1957 | Solari . |
| 2,859,988 | 11/1958 | Payne . |
| 2,994,547 | 8/1961 | Dolhun . |
| 3,235,274 | 2/1960 | Cain, Jr. et al. ........ 277/DIG. 10 X |
| 3,306,223 | 2/1967 | Liebig . |
| 3,356,378 | 12/1967 | Tracy ............................ 277/81 R X |
| 3,367,274 | 2/1968 | Lombard . |
| 3,447,810 | 6/1969 | Porter ................................... 277/85 |
| 3,457,870 | 7/1969 | Sleeter . |
| 3,511,513 | 5/1970 | Dahlheimer . |
| 3,554,559 | 1/1971 | Dahlheimer . |
| 3,567,230 | 3/1971 | Gits . |
| 3,632,220 | 1/1972 | Lansinger . |
| 3,914,072 | 10/1975 | Rowley et al. . |
| 4,095,807 | 6/1978 | Jandt et al. . |
| 4,342,538 | 8/1982 | Wolford et al. .................. 277/82 X |
| 4,427,204 | 1/1984 | Alley ..................................... 277/85 |
| 4,659,092 | 4/1987 | Wallace et al. ............... 277/81 R X |

FOREIGN PATENT DOCUMENTS

680004  2/1964  Canada .

Primary Examiner—Harvey C. Hornsby
Assistant Examiner—Stephen F. Gerrity
Attorney, Agent, or Firm—Watts, Hoffmann, Fisher & Heinke

[57] ABSTRACT

A seal cartridge for providing a fluid seal between a rotating shaft and a housing such as found in a centrifugal pump. The seal cartridge includes rotating and non-rotating seal portions which prior to installation are maintained in alignment and carried by a tubular or sleeve-like support member so that the cartridge forms a unitary assembly. The non-rotating seal portion includes a seal ring seat that is connected to the support sleeve by a frangible element. During an installation process, after the seal ring seat reaches its installed position, the frangible element fractures and releases the non-rotating portion of seal from the support member thus enabling the rotating portion of the seal to rotate relative to the non-rotating portion. The support sleeve can be rigidly clamped to the shaft by a conventional pump impeller.

20 Claims, 6 Drawing Sheets

FACE TYPE SEAL ASSEMBLY

TECHNICAL FIELD

The present invention relates generally to rotary, mechanical shaft seals and in particular to an improved face type shaft seal.

BACKGROUND ART

Pumps and similar equipment which include rotating shafts have been provided with seals of various types to prevent leakage along their shafts. One conventional type of seal is known as a face seal and typically comprises a rotating portion fixed to the shaft defining a radial sealing face and a fixed portion secured to the housing also defining a radial sealing face, the two sealing faces disposed in abutting, sealing contact. Normally, the seal faces are maintained in engagement by a spring forming part of the seal assembly.

Examples of this type of seal can be found in U.S. Pat. No. 3,447,810 and U.S. Pat. No. 4,342,538, both owned by the assignee of the present application.

The seal construction disclosed in these two U.S. patents are similar in that both include a non-rotating seal section mounted in a pump cavity and a rotating seal section mounted to the shaft. The rotating seal section includes a coil spring surrounding the shaft for spring loading a rotating seal ring towards engagement with a non-rotating seal ring forming part of the fixed seal section. Both seal rings define radial faces which during pump operation sealingly engage.

In general, the components comprising the non-rotating seal portion are mounted in a seal cavity defined by the pump housing. In these applications, access to the seal components is very limited. With these prior seals, the non-rotating seal section is installed in position at the innermost end of the seal cavity. Special tools may be needed in order to properly mount and secure the non-rotating seal components. Alignment of the various elements is usually very critical.

The rotating section of the seal is then mounted to the pump shaft and located such that a face of the associated seal ring confrontingly engages the mating seal ring forming part of the non-rotating seal section. Because access is very limited, errors in assembly can occur which are not manifested until the pump is put into operation. Improper alignment of the seal components can lead to leakage and premature seal failure. Replacement of a failed seal in the field can be very difficult and time consuming especially if done improperly.

In order to maximize seal life, the radial seal faces of the mating seal rings must be maintained in a clean condition during installation. Cleanliness can be difficult to sustain when replacing individual seal components out in the field. Contamination of the seal faces can produce premature seal failure.

DISCLOSURE OF THE INVENTION

The present invention provides a new and improved seal cartridge for sealing the interface between a rotating shaft and a stationary housing such as that found in a centrifugal pump. According to the invention, the seal cartridge is constructed as a unitary assembly having interconnected rotating and non-rotating portions. During installation of the seal cartridge, the coupling between the rotating and non-rotating portions is disconnected or separated so that after installation, the rotating portion is operatively connected to the shaft and the non-rotating portion is fixed to the housing. In addition, a rotating, sealing interface is defined between the non-rotating and rotating portions.

To facilitate the explanation of the invention, it will be described in connection with its use in a centrifugal pump. It should be understood, however, that the invention can be used in any application that requires a rotary seal for sealing a shaft/housing interface.

In the preferred embodiment, the seal cartridge includes a support member which prior to installation supports both the non-rotating and rotating portions of the seal. According to the invention, a frangible member couples the non-rotating portion of the seal to the support member.

In the preferred and illustrated embodiment, the support member comprises a sleeve-like element which is adapted to receive an impeller shaft of a centrifugal pump. The rotating portion of the seal comprises a spring biased, rotatable seal ring which in the preferred embodiment is attached to a bellows that enables the seal ring to move axially with respect to the shaft. The bellows is clamped to the support sleeve and also carries a cage member which circumferentially locates the rotatable seal ring. A spring captured between the cage member and a spring centering member, supported by the sleeve, applies the biasing force to the rotatable seal ring urging it towards abutting contact with a non-rotating seal ring forming part of the non-rotating portion of the seal.

The non-rotating portion of the seal includes a seal seat which supports the stationary seal ring and which is secured to housing structure. In the preferred and illustrated embodiment, a frangible shear ring interconnects the seal ring seat with the support sleeve. During installation, the shear ring separates along one or more lines of weakness so that the stationary seal portion is decoupled from the sleeve enabling the rotatable seal ring to rotate relative to stationary seal ring.

According to the invention, the seal cartridge is installed into the mechanism i.e. pump, by placing the assembly onto the shaft. The support member is pushed or advanced until the seal seat reaches its installed position. Further advancement of the support member causes the frangible coupling to separate so that the non-rotating portion of the seal is decoupled from the support member enabling the rotating portion to rotate relative to the non-rotating portion.

In the preferred embodiment, the support sleeve is advanced onto the shaft until an end surface abuts a shoulder formed on the shaft. The sleeve is locked or clamped in position by a locking element which locks the support sleeve and hence the rotating portion of the seal to the shaft.

In the disclosed embodiment, the seal cartridge is used to seal the rotating shaft of a centrifugal pump. In this embodiment, the seal is located in a seal cavity defined by a cup-shaped seal plate. The pump shaft includes a threaded end adapted to threadedly receive an impeller. In the preferred installation method, the seal cartridge is placed on the end of the impeller shaft and the impeller is then threaded onto the shaft end. An inner end-face of the impeller abuts an end of the seal cartridge and advances the support sleeve axially along the pump shaft as the impeller is threaded onto the shaft end. The support sleeve is sized such that when fully installed, it is clamped between the inner end-face of the impeller and a shoulder formed on the pump shaft and is rigidly held thereto.

In accordance with this embodiment, the seal cavity defines a recess for receiving the non-rotating seal ring seat which is located such that the seat is frictionally received in the recess, during the installation process, prior to the engagement of the sleeve with the shaft shoulder so that the frangible support member fractures or separates as the support sleeve is advanced to its installed position (at which it is abuts the shoulder of the shaft).

With the present invention, the pump shaft seal can be easily replaced in the field. Unlike the prior art, both the non-rotating and rotating portions of the seal are maintained in proper alignment during the installation process and hence seal integrity is maintained.

Additional features of the invention will become apparent and a fuller understanding obtained by reading the following detailed description made in connection with the accompanying drawings.

BEST MODE FOR CARRYING OUT THE INVENTION

Figure 1:
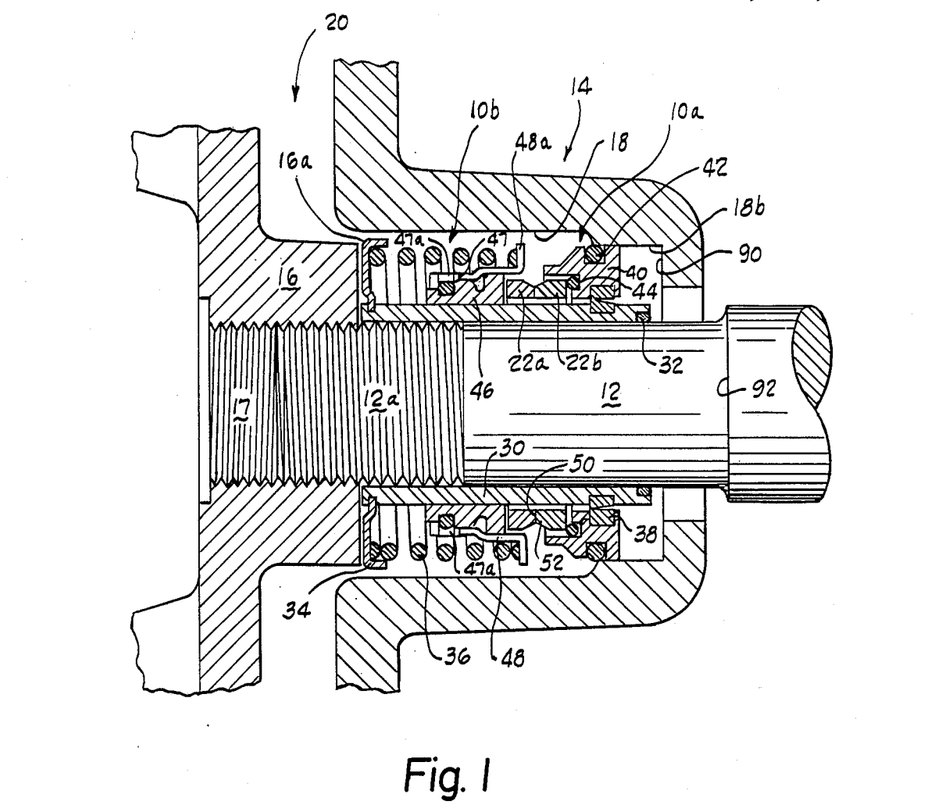
FIG. 1 is a fragmentary, sectional view of a centrifugal pump showing a seal cartridge, constructed in accordance with a preferred embodiment of the invention, as it appears at the beginning of an installation process.
Figure 2:
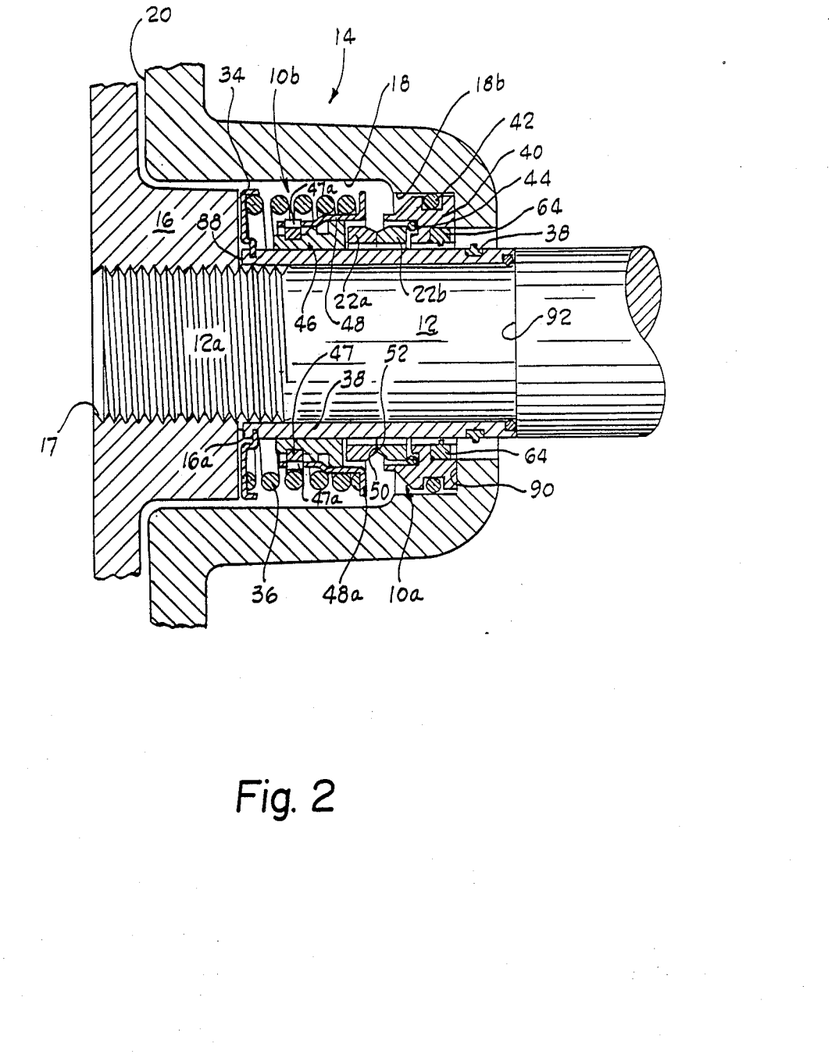
FIG. 2 is another fragmentary, sectional view of the centrifugal pump showing the seal cartridge as it appears at the completion of the installation process.

FIGS. 1 and 2 illustrate the overall construction of a seal cartridge 10, constructed in accordance with the preferred embodiment of the invention, shown as it appears at the commencement of an installation process (FIG. 1) and as it appears after the installation process is completed. FIGS. 3-10 illustrate the construction of some of the components that comprise the seal cartridge.

Turning first to FIGS. 1 and 2, the seal cartridge 10 is shown as it would be used in a pump application. In particular, the seal 10 is operative to seal the interface between a pump shaft 12 and a pump housing (a portion of which is indicated generally by the reference character 14) to inhibit fluid leakage along the shaft and into the interior of the housing. In the disclosed embodiment, the pump is of the centrifugal type and includes an impeller 16 threadedly mounted to a threaded end 12a of the pump shaft 12. The impeller 16 includes a threaded central bore 17 for receiving the shaft end 12a.

As is conventional, the housing 14 defines a cup-shaped seal cavity 18 including a machined recess 18b which normally receives a non-rotating portion of a shaft seal (indicated generally by the reference character 10a). The remainder of the seal cavity 18 shrouds a rotating part of the shaft seal, indicated generally by the reference character 10b, and at least partially protects seal components from material being pumped through an impeller chamber 20.

According to the invention, the seal cartridge 10 is constructed as a unitary assembly with the rotating portion 10b and the non-rotating portion 10a coupled together so that both portions of the seal are installed concurrently during an installation process. As indicated above, in the prior art method of installing a seal, a non-rotating portion of the seal would be first pressed into the recess 18b and after being seated, a rotating portion of the seal would then be installed onto the pump shaft 12 until mating seal rings (such as seal rings 22a, 22b shown in FIG. 1) abuttably engage.

With the illustrated construction, however, the entire seal including both the rotating and non-rotating portions 10a, 10b are installed concurrently. The alignment of the parts are maintained throughout the installation process.

Figure 3:
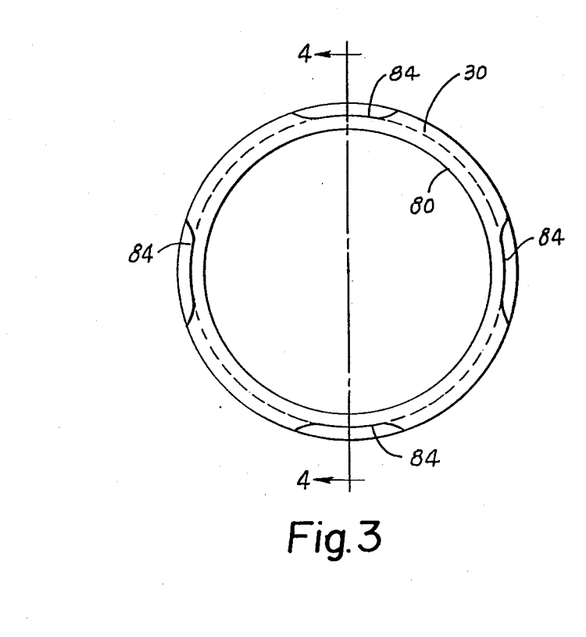
FIG. 3 is an end-view of a support member forming part of the seal cartridge.
Figure 4:
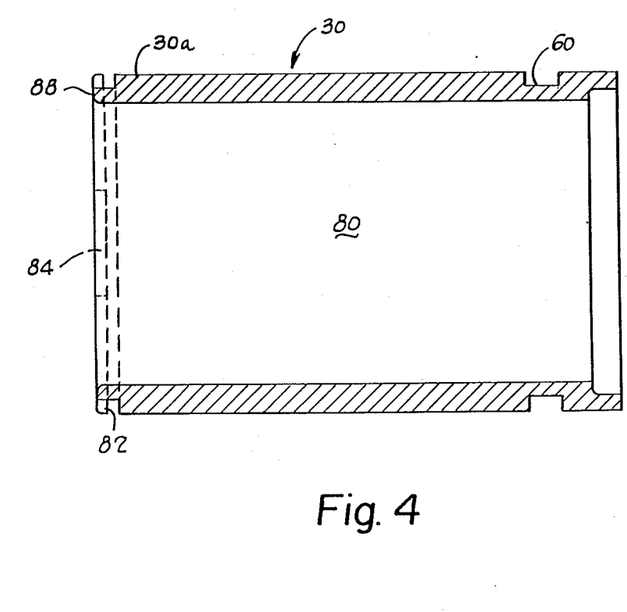
FIG. 4 is a sectional view of the support member as seen from the plane indicated by the line 4—4 in FIG. 3.

Referring also to FIGS. 3 and 4, the seal cartridge 10 includes a tubular support member 30 which is adapted to fit around or receive the pump shaft 12. The support member 30 includes an O-ring type seal 32 (shown in FIGS. 1 and 2 only) for inhibiting fluid leakage between itself and the pump shaft 12. A left end 30a of the support member 30 (as viewed in FIG. 1) mounts a centering washer 34 which also serves as a spring seat for a biasing spring 36. A frangible mounting ring 38 is carried near a right end 30b (as view in FIG. 1) of the support member 30 which, at least for a portion of the installation process, rigidly supports a non-rotating seal ring seat 40 which forms part of the non-rotating portion 10a of the seal 10. The frangible ring 38 causes the seal ring seat 40 to move with the support member 30 as the support member is advanced along the pump shaft 12 i.e. towards the right as viewed in FIG. 1.

The non-rotating seal ring seat 40 includes an O-ring seal 42 which sealing engages the recess 18a to inhibit fluid leakage between itself and the housing 14. The seal ring seat 40 carries the seal ring 22b in a way that inhibits relative rotation between itself and the seal ring and also carries an O-ring seal 44 for inhibiting fluid leakage between the seat 40 and the seal ring 22b.

As is conventional, the rotating portion 10b of the seal cartridge 10 includes a bellows member 46 clamped at its left end to the support member 30 (as viewed in FIG. 1) by a drive band 47. In particular, the drive band 47 causes the bellows member 46 to frictionally engage the support member 30. The frictional engagement enables the bellows to slide axially along the support member during installation if sufficient force is applied. During pump operation the bellows member 46 grips the support member with a frictional force sufficient to transmit torque to the seal ring 22a when the shaft 12 rotates.

The transmission of torque is achieved as follows. The right end of the bellows 46 is connected to the rotating seal ring 22a and allows the seal ring 22a to move axially towards and away from the stationary seal ring 22b. A conventional cage member 48 including an outwardly turned, radial lip 48a supports the seal ring 22a and rotatably couples the ring to the bellows and hence the support member 30, while still allowing axial movement in the seal ring 22a relative to the support member 30. Splines or lugs/lug engaging recesses (not shown) may be formed on the cage 48 (and on the seal ring 22a) to provide the requisite drive coupling between the elements. The drive band 47 includes a plurality of axially extending tabs that are received in associated slots (not shown) formed in the cage 48. The engagement between the slots and the tabs 47a provide a slidable coupling between the cage 48 and the drive band 47 (and hence the bellows 46) which rotatably couples the seal ring 22a (via the cage 48, the drive band 47 and the left end of the bellows 46) to the support member 30. The biasing spring 36 acts between the centering washer 34 and the lip 48a of the cage and exerts a biasing force on the seal ring 22a urging a radial face 50 into abutting, sealing contact with a radial face 52 of the seal ring 22b.

As indicated above, at the commencement of the installation process, the rotating and non-rotating portions 10b, 10a of the seal cartridge 10 are interconnected so that both portions are installed concurrently. In particular, the stationary seal ring seat 40 is coupled to the support member 30 by the frangible ring-like element 38. For purposes of explanation the element 38 will be termed a "shear ring". As seen best in FIGS. 3 and 4, the shear ring 38 is carried by an annular groove 60 formed near the right end of support member 30 (as viewed in FIG. 1).

Figure 9:
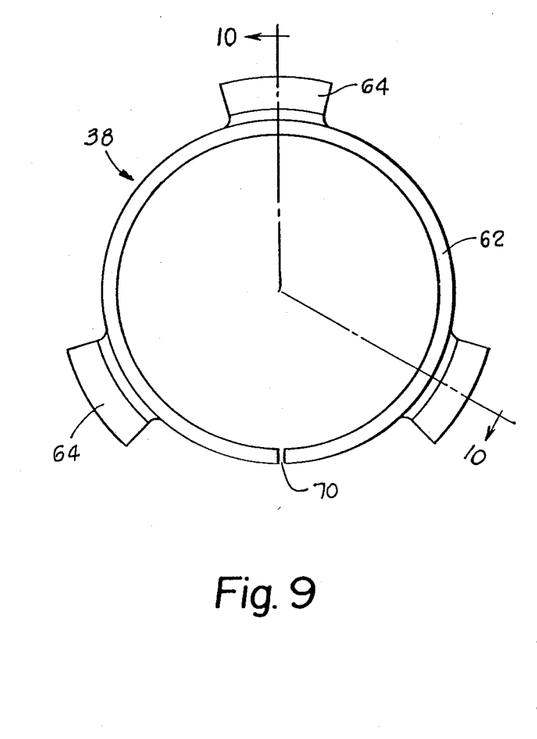
FIG. 9 is a side, elevational view of a frangible element forming part of the seal cartridge; and, FIG. 10 is a sectional view of the frangible element as seen from the plane indicated by the line 9—9 in FIG. 10.
Figure 10:
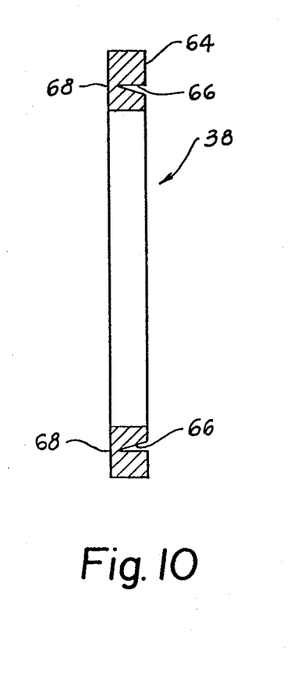

Referring also to FIGS. 9 and 10, the shear ring 38 includes an annular band-like portion 62 which is received by the groove 60 and three tab-like members 64 spatially located along the circumference of the band-like portion 62. In the preferred embodiment, the radial center lines of the tabs 64 are spaced substantially 120 degrees apart. As seen best in FIG. 10, each tab 64 includes a notch 66 defining a region of weakness indicated generally by the reference character 68. The band-like portion 62 also includes a slit 70 which enables the band-like portion 62 to be spread apart in order to install the shear ring 38 onto the support member 30 (into the annular groove 60). In the preferred embodiment, the shear ring 38 is made of a somewhat resilient material, preferably a plastic material such as nylon.

Figure 7:
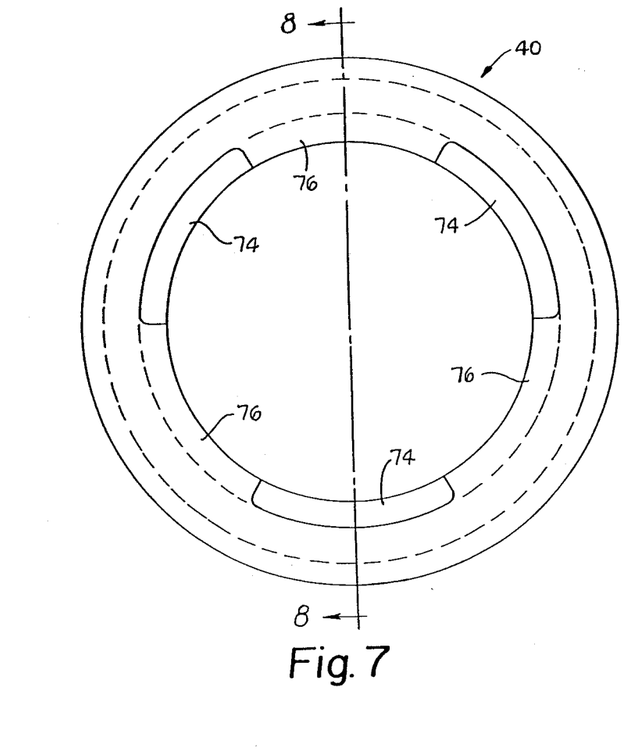
FIG. 7 is an end view of a non-rotating, seal ring seat forming part of the seal cartridge.
Figure 8:
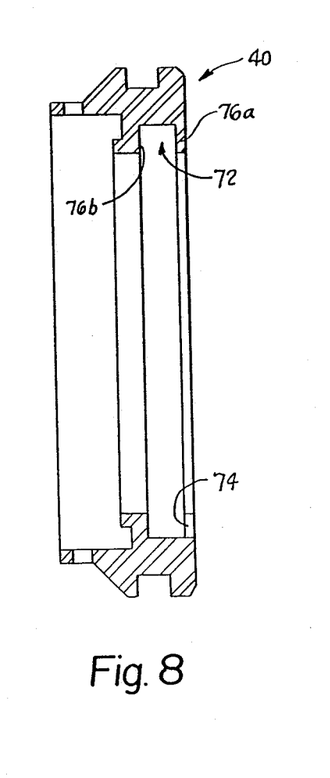
FIG. 8 is a sectional view of the seal ring seat as seen from the plane indicated by the line 8—8 in FIG. 7.

Referring also to FIGS. 7 and 8, the non-rotating seal ring seat 40 includes an inner annular groove 72 for receiving the support tabs 64 of the shear ring 38. As seen in FIG. 7, three slots 74 are formed in the seat 38 through which the tabs 64 of the shear ring 38 are inserted in order to install the shear ring 38 onto the seat 40. After insertion, the shear ring 38 is rotated so that the tabs are captured between a backwall 76a and inside wall 76b of the groove 72 thus interlocking the seat 40 with the shear ring 38.

Figure 5:
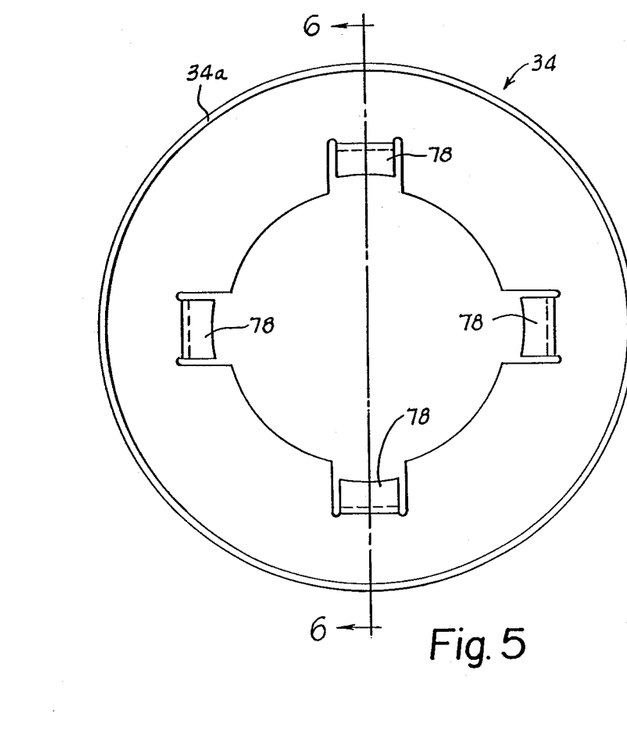
FIG. 5 is a side elevational view of a centering member forming part of the seal cartridge.
Figure 6:
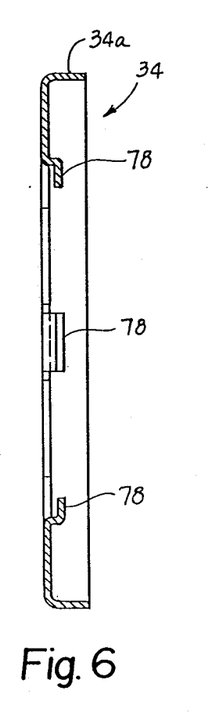
FIG. 6 is a sectional view of the centering member as seen from the plane indicated by the line 6—6 in FIG. 5.

A similar type of engagement is provided for the centering washer 34. As seen in FIGS. 5 and 6, the centering washer 34 includes a circumferential, axial flange 34a for confining the end of the biasing spring 36 and four inwardly directed lugs 78. In the preferred embodiment the lugs 78 are L-shaped in cross section.

Turning now to FIGS. 3 and 4, the support member 30 is preferably tubular or sleeve-like in construction. The member 30 defines a through bore 80 and an external, annular groove 82 near its left end 30a. Four cut out portions or circular notches 84 interrupt an outer wall 82a of the groove 82. The notches 84 enable the L-shaped lugs 78 to move into engagement with the annular groove 82. The centering washer 34 is locked to the end of support member 30 by rotating the centering washer 34 (after inserting the lugs 78 into the groove 82 via the notches 84) until the lugs are positioned behind wall segments 86 of the groove 82.

In the preferred installation method and referring in particular to FIGS. 1 and 2, the cartridge assembly 10 (including cross-coupled rotating and non-rotating portions 10a, 10b) is placed on the pump shaft 12. The bore 80 of the support member 30 is sized to receive the pump shaft 12, preferably with a fairly close fit. The pump impeller 16 is then threaded onto the end 12a of pump shaft 12 which is then used to press the seal cartridge 10 into position. As the pump impeller 16 is threaded onto the pump shaft 12, a radial face 16a engages a radial end face 88 defined by the left end 30a of the support member 30. Rotation of the impeller onto the shaft 12 and pushes the support member 30 towards the right (as viewed in FIG. 1). i.e. towards its installed position (shown in FIG. 2). The shear ring 38 supports the non-rotating seal ring seat and maintains its alignment with the seal cavity recess 18b. In the preferred installation method, the support member 30 is gradually pushed axially along the shaft 12 and carries or drives the seal ring seat 40 into the recess 18b.

After the seal ring seat 40 bottoms in the recess 18b i.e. once a radial end face 40a of the seat abuts a radial end surface 90 defined by the recess 18b, continued advancement of the support member 30 (by rotating the impeller further onto the pump shaft 12) causes the tabs 64 of the shear ring 38 to separate from the annular band-like portion 62 as seen in FIG. 2. The tabs 64 sever or fracture in the regions of weakness 68 defined by the notches 66 (shown best in FIGS. 10). The support member advances axially along the pump shaft 12 until a right end (as viewed in FIG. 2) abuts a shoulder 92 formed on the pump shaft. During this final advancement, sufficient force is applied to the support member to overcome the frictional engagement between itself and the left end of the bellows. In effect the bellows 46 slides axially on the support member 30 as the support member advances to its final installed position (after the shear ring 38 separates). In the preferred embodiment, the shear ring 38 is constructed to separate before the frictional engagement between the bellows 46 and the support member releases. After installation, the frictional engagement between the support member 30 and the bellows 46 forms a torsionally strong bond for transmitting torque from the shaft 12 to the seal ring 22a.

The support member 30 is locked to the pump shaft 12 by virtue of being clamped between the radial face 16a of the impeller 16 and the shoulder 92 on the pump shaft 12. In the preferred embodiment, the support member 30 is advanced a sufficient distance so that the band-like portion 62 of the shear ring 38 is axially spaced inwardly, from the seal ring seat 40 so that during rotation of the pump shaft 12 the shear ring portion carried by the support member 30 does not interfere with or contact the seal ring seat 40.

After installation, the rotating and non-rotating portions 10a, 10b of the seal are relatively rotatable. The fluid seal is established by the abutting contact between the radial seal faces 50, 52 defined by the rotating and non-rotating seal rings 22a, 22b, respectively. With the disclosed invention, a rotary shaft seal on a pump or other mechanism can be easily be replaced in the field even in those situations where space or access to the seal region is limited. With the disclosed invention, seal installation is a one step process and eliminates the need for separately installing a fixed, non-rotating seal ring seat into the housing followed by the installation of a rotating seal portion onto the shaft.

Although the invention has been described with a certain degree of particularity, it should be understood that those skilled in the art can make various changes to it without departing from the spirit or scope of the invention as hereinafter claimed.

I claim:

1. A seal cartridge for providing a fluid seal between a rotating shaft and a housing, comprising:
   (a) a tubular support member adapted to receive a rotatable shaft;
   (b) said support member supporting rotating and non-rotating seal portions, said rotating portion being coupleable to a rotatable shaft and said non-rotating portion being coupleable to a housing;
   (c) a frangible support means for supporting said non-rotating seal portion in a predetermined position with respect to said rotating portion, during an installation process; and,
   (d) said frangible support means releasing said non-rotating seal portion as said support member is advanced onto said rotatable shaft prior to reaching an installed position.

2. The seal cartridge of claim 1 wherein said frangible means comprises a ring having a plurality of radial extending tabs, each of said tabs defining a region of weakness.

3. The apparatus of claim 1 wherein said non-rotating and rotating seal portions each mount a seal ring defining a radial face confrontingly engageable with the radial face defined by the other seal ring.

4. A method for installing a rotary shaft seal to provide a fluid seal between a rotatable pump shaft and a housing, comprising the steps of:
   (a) mounting a non-rotating seal portion onto a support member using a frangible connecting means;
   (b) rigidly mounting a rotating portion of said seal onto said support member;
   (c) placing said support member onto a pump shaft having a threaded end;
   (d) threadedly engaging a pump impeller on said threaded end of said shaft and threading said impeller onto said shaft until a surface on said impeller abuts an end of said support member such that further threading of said impeller onto said shaft advances said support member axially onto said shaft;
   (e) threading said impeller onto said shaft until the non-rotating portion of said seal, secured by said frangible connecting means, is seated in housing structure adapted to receive said non-rotating seal portion; and,
   (f) continuing to thread said impeller onto said shaft to continue advancing said support member whereby said frangible connecting means separates along at least one region of weakness thereby releasing said nonrotating portion of said seal from said support member enabling said non-rotating portion and said support member to relatively rotate.

5. The method of claim 4 further comprising the step of threading said impeller onto said shaft until said support member is rigidly clamped on said pump shaft such that relative movement between said support member and said shaft is inhibited.

6. A seal cartridge for providing a fluid seal between a rotatable shaft and a housing, comprising:
   (a) a support member mounting a rotatable seal portion including a rotatable seal ring; and,
   (b) a non-rotating seal portion held to said support member, prior to installation, by a frangible element;
   (c) said frangible element separating along at least one line of weakness as said support member reaches an installed position on said shaft.

7. The seal cartridge of claim 6 wherein said support member is sleeve-like in construction and defines a bore for receiving said shaft.

8. The apparatus of claim 7 wherein said frangible member comprises a sear ring including an annular band-like portion and a plurality of radially extending tabs, each of said tabs including a notch defining a region of weakness, said tabs operative to temporarily secure said non-rotating portion of said seal to said support member during at least a portion of an installation process.

9. The apparatus of claim 8 wherein said non-rotating portion of said seal includes a non-rotatable seal ring seat that includes an internal groove and a plurality of notches interrupting a wall of said groove through which said tabs of said shear ring can be inserted in order to engage at least segments of said groove.

10. The apparatus of claim 7 wherein said support member defines structure by which a centering means for said rotatable seal portion can be interlocked to said support member.

11. The apparatus of claim 10 wherein said structure comprises a groove located near one end of said support member and a plurality of notches interrupting a wall of said groove through which interlocking structure defined by said centering means is insertable in order to engage said groove whereupon slight rotation of said centering means secures said centering means to said support member.

12. A seal cartridge for providing a fluid seal between a rotatable shaft and a housing, comprising:
   (a) a support member mounting a rotatable seal portion including a rotatable seal ring and a nonrotating seal portions mounting a non-rotating seal rings;
   (b) said seal rings defining seal surfaces co-engageable to define a sealing interface between said shaft and said housing; and,
   (c) one of said rotatable and non-rotating seal portions secured to said support member, prior to installation, by a frangible element;
   (d) said frangible element separating along at least one line of weakness as said support member reaches an installed position on said shaft such that said one seal portion is released from said support member.

13. The seal cartridge of claim 12 wherein said one seal portion comprises said non-rotating seal portion.

14. The seal cartridge of claim 12 wherein said rotatable seal portion includes:
   (a) biasing means for urging said rotatable seal ring towards sealing contact with said non-rotating seal ring;
   (b) bellows means connecting said rotatable seal ring to said support member, said bellows means allowing axial movement in said rotatable seal ring while inhibiting relative rotation between said shaft and said rotatable seal ring; and, (c) a centering element interlocked with said support member for maintaining a predetermined alignment of said rotatable seal portion.

15. The seal cartridge of claim 14 wherein said support member comprises a sleeve-like element that is clamped to said shaft by a locking element.

16. The seal cartridge of claim 15 wherein said rotatable shaft comprises a pump shaft and said locking element comprises a pump impeller.

17. The seal cartridge of claim 16 wherein said support member is clamped between said pump impeller and an abutting surface formed on said pump shaft.

18. The seal cartridge of claim 17 wherein said abutting surface comprises a shoulder formed on said shaft.

19. The seal cartridge of claim 14 wherein said bellows means frictionally engages said support member.

20. The seal cartridge of claim 19 wherein said frangible element is constructed such that a force necessary to cause separation in said frangible element is less than a force necessary to overcome the frictional engagement between said bellows means and said support member.

* * * * *